Patented Apr. 30, 1935

1,999,455

UNITED STATES PATENT OFFICE 1,999,455

METHOD OF PRODUCING ALBUMINOID MATERIAL

Gustaf Olof Wolfgang Heijkenskjöld, Stockholm, Sweden

No Drawing. Application March 30, 1931, Serial No. 526,560. In Sweden December 6, 1929

10 Claims. (Cl. 195—20)

My invention comprises a novel method for obtaining nitrogen from air with the aid of nitrogen-fixing bacteria.

Such bacteria are the Azotobacter and Clostridium and usually they fix the free nitrogen with the aid of carbohydrates, such as sugar, so that within the bacteria nitrogen is obtained in the form of albuminoid substances.

I shall now describe preferred embodiments of the method involved and for the sake of simplicity I shall describe my invention in connection with obtaining nitrogen from air but I wish it to be understood that the invention is not limited thereto but comprises also utilizing all sorts of gaseous nitrogen.

To carry out the method according to the invention I may cultivate the bacteria in a nutrient liquid which contains such nutrients as are necessary for the activity of the bacteria. Such nutrients are sugar and phosphates. During the cultivation I aerate the culture medium strongly and while the aeration may be effected by sprinkling or by other means I prefer to blow continuously great quantities of air through the culture medium. The Azotobacter or other bacteria employed then absorb sugar and other nutrients from the nutritive liquid, at the same time absorbing nitrogen from the air blown through. If the liquid does not contain nutrients in a sufficient quantity, such nutrients are added in the required quantity before or during the cultivation and I prefer to add such nutrients continuously or fractionally at the same rate as they are assimilated by the bacteria.

As a nutrient solution I prefer to use waste sulphite liquor alone or in mixture with other nutritive matter. Suitably the solution should consist substantially of waste sulphite liquor which is a cheap material and contains 2 to 3% of sugar but is weak in nitrogen. It should be noted that the Azotobacter are able to utilize all the sugar of the sulphite liquor and not only the fermentable sugar. While I might use the liquor in the condition in which it leaves the wood pulp digester, I prefer first to treat the liquor to neutralize the poisonous matter of the same in the required degree. When the bacteria have absorbed the desired quantity of nitrogen they may be subjected to some treatment to extract the nitrogen or nitrogen compounds for some useful purpose.

In the following I shall describe more in detail an embodiment of my method.

I plant a culture of Azotobacter in waste sulphite liquor which has been neutralized and preferably treated in the same way as when preparing a wort for the cultivation of yeast, for instance, according to my U. S. Patent No. 1,703,272. Before sowing the Azotobacter in the liquor I cool the liquor to a suitable temperature, for instance 30 to 50° C. Preferably I neutralize the poisonous matter by treating the waste sulphite liquor with powdered limestone and slaked lime in the form of lime milk and, if necessary, also with sodium carbonate, while aerating strongly so that the liquor will be only slightly acid or show an alkalinity of, for instance, 0.2 to 1.0, expressed as the number of c. c. of normal acid necessary to neutralize 100 c. c. waste sulphite liquor using litmus paper as indicator. I then sow a culture of Azotobacter in the neutralized and purified liquor which acts as a medium therefor. I then blow air in great quantities through the culture and add solution containing sugar and phosphates or other nutrients. In this way the Azotobacter fix, partly, sugar and phosphate or other nutrients added to the liquor and, partly, nitrogen from the air introduced. In the manner described the Azotobacter may be propagated while accumulating nitrogenous matter.

When the desired quantity of nitrogenous matter has been absorbed by the bacteria I separate the bacteria from the liquor, for example by passing the same through a separator or by filtration. The nitrogen-containing bacteria obtained may now be used either as such or together with the precipitate or deposit of lime obtained in neutralizing the sulphite liquor, for instance, to improve soil by increasing the amount of nitrogen therein.

Instead of sowing the bacteria in the whole amount of the culture medium, I may plant the bacteria in a small amount of such culture medium and add the waste sulphite liquor or other nutrient solution continuously or fractionally to the culture medium under aeration.

The culture medium in which I plant the bacteria may be higher in sugar than the waste sulphite liquor successively added thereto. By this means I effect a strong development and activity of the bacteria before adding the waste sulphite liquor.

As is well known, the waste sulphite liquor, besides containing sugar in the above mentioned percentage, also contains great quantities of substances, such as lignine substances, at least part of which is difficult to utilize and must be considered to represent an unnecessary dead-weight. Such dead-weight substances may have a detrimental effect on the cultivation of the nitrogen-fixing bacteria in the liquor and to lessen such detrimental effects I proceed as follows:

The bacteria are cultivated in a nutrient solution under aeration as usual. Further waste sulphate liquor or other nutritive liquid may be added continuously or fractionally. During this continuous cultivation I continuously withdraw solution from the cultivation tank and separate the bacteria from the solution withdrawn. The effect is that the detrimental substances do not accumulate in the cultivating tank but are always kept at their normal percentage. To obtain the best results I prefer to return to the cultivating tank all or part of the bacteria separated from the solution withdrawn. In this way the percentage of detrimental substances relatively to the quantity of bacteria will be lessened in the tank.

When using waste sulphite liquor or a culture medium it is desirable to aerate so strongly that not only the necessary amount of nitrogen is supplied but also that the Azotobacter are protected against the poisonous matters of the sulphite liquor.

By means of the method now described it is possible to work the bacteria-cultivating and nitrogen-obtaining process continuously with continuous addition of nutrient solution and continuous withdrawal of utilized solution as well as continuous separation of the bacteria from the solution. The part of the separated bacteria not returned to the liquor constitutes the final product.

The nitrogen accumulated by the bacteria may be used for many useful purposes. As described above, the separated bacteria may be used without further treatment, for instance for agricultural or other purposes. The product is an albuminoid material having a composition similar to common baker's yeast. It cannot cause fermentation but has a high food value because its albumin is easily digestible. In some cases the bacteria may be subjected to special treatment to obtain the nitrogen in a more assimilable form.

If the nitrogen accumulated in the bacteria is to be absorbed by yeast fungi or the like it is generally necessary to convert the nitrogen into a more assimilable form. I may perform this by treating the Azotobacter, for instance, with alkali or alkaline matter so as to decompose the bacteria. I thereby obtain the nitrogen in a water soluble form, for instance, as ammonia or compounds thereof. In the propagation of yeast while using waste sulphite liquor as the main nutrient I may proceed as follows:

The nitrogenous matter obtained when decomposing the bacteria, the alkaline matter employed and, if necessary, a liquid, such as water, is added to waste sulphite liquor to neutralize the same and to obtain a nutrient solution suitable for the propagating of yeast. In that way I obtain a wort which contains sugar as well as the amount of nitrogen necessary for the growth of the yeast. I may also add the bacteria to waste sulphite liquor which has been pretreated so that its poisonous matter, above all sulphurous acid, is neutralized. I may then continue the process by cultivating the yeast in the pretreated wort so that the bacteria are brought into activity during the yeast cultivation. In this way the yeast fungi may obtain part of or the whole of their requirement of nitrogen from the Azotobacter-nitrogen during the yeast cultivation.

The waste wort from any fermentation process generally contains unfermentable sugar and other nutrients, which cannot be assimilated by the various yeast fungi employed. My method also involves the cultivating under aeration of nitrogen-fixing bacteria in such waste worts and extraction of the nitrogen accumulated by the bacteria.

In cultivating yeast as described above it is possible to impart to the waste sulphite liquor, which in itself is very weak in nitrogen, an amount of easily yeast-assimilable nitrogen which is quite sufficient for the requirements of the yeast. On the other hand further amounts of organic or inorganic nitrogenous matter may be added to the wort during the propagation of the yeast.

While I have described in detail the preferred embodiment of my invention, it is to be understood that the invention is not limited to the precise embodiment disclosed but may be varied in various aspects and that various of the novel steps of my method may be used in combination with other known steps instead of those set out.

Having thus described my invention, what I claim is:—

1. The process of utilizing waste liquor containing sugar for the cultivation of Azotobacter which comprises treating said liquor to substantially neutralize the poisonous material, sowing a culture of Azotobacter in the part of the liquor thus treated at a temperature suitable for propagation of said Azotobacter, causing the bacteria to propagate and form an albuminoid material in said part of the liquor, aerating the liquor to remove poisonous substances and to introduce air as a source of nitrogen for the bacteria, withdrawing portions of the material and adding further quantities of the neutralied liquor to the remaining portions, separating the Azotobacter from the portion so withdrawn and returning a part of the separated Azotobacter to the liquor containing the culture, the part not so returned constituting an albuminoid product.

2. The process of utilizing waste liquor containing sugar for the cultivation of Azotobacter which comprises sowing a culture of Azotobacter in a medium having a greater nutritive content than said liquor at a temperature suitable for propation of said Azotobacter, continuously adding said liquor to said medium together with further nutrients, aerating said liquor to provide nitrogen and to remove harmful constituents, continuously removing a portion of the liquor and Azotobacter, separating the Azotobacter from the portions so removed and returning a part of the Azotobacter to the medium whereby the concentration of the Azotobacter with respect to the impurities in the liquor is increased.

3. The process of utilizing waste sulphite liquor for the cultivation of Azotobacter which comprises neutralizing the poisonous constituents of said liquor, sowing said Azotobacter in a medium having a greater nutritive content than said liquor at a temperature suitable for propagation of said Azotobacter, continuously adding said liquor and nutritive material to said medium and aerating to supply nitrogen thereto whereby said bacteria utilize said nitrogen and said nutritive matter to form an albuminoid substance, continuously withdrawing a portion of the material and separating the Azotobacter therefrom and returning a part of the bacteria so withdrawn whereby to build up the concentration thereof in said liquor.

4. The process of utilizing waste sulphite liquor for the cultivation of Azotobacter which comprises treating said liquor with powdered limestone to neutralize the poisonous constituents thereof, sowing said Azotobacter in a medium having a greater nutritive content than said liquor at a temperature suitable for propagation of said Azotobacter, continuously adding said liquor and nutritive material to said medium and aerating to supply nitrogen thereto whereby said bacteria utilize said nitrogen and said nutritive matter to form an albuminoid substance, continuously withdrawing a portion of the material and separating the Azotobacter therefrom and returning a part of the bacteria so withdrawn whereby to build up the concentration thereof in said liquor.

5. The process of utilizing waste sulphite liquor for cultivation of Azotobacter which comprises treating said liquor with powdered limestone and sodium carbonate to neutralize the poisonous constituents thereof, sowing said Azotobacter in a medium having a greater nutritive content than said liquor at a temperature suitable for propagation of said Azotobacter, continuously adding said liquor and nutritive material to said medium and aerating to supply nitrogen thereto whereby said bacteria utilize said nitrogen and said nutritive matter to form an albuminoid substance, continuously withdrawing a portion of the material and separating the Azotobacter therefrom and returning a part of the bacteria so withdrawn whereby to build up the concentration thereof in said liquor.

6. The process of utilizing waste sulphite liquor for the cultivation of Azotobacter which comprises treating said liquor with powdered limestone, slaked lime and sodium carbonate to neutralize the poisonous constituents thereof, sowing said Azotobacter in a medium having a greater nutritive content than said liquor at a temperature suitable for propagation of said Azotobacter, continuously adding said liquor and nutritive material to said medium and aerating to supply nitrogen thereto whereby said bacteria utilize said nitrogen and said nutritive matter to form an albuminoid substance, continuously withdrawing a portion of the material and separating the Azotobacter therefrom and returning a part of the bacteria so withdrawn whereby to build up the concentration thereof in said liquor.

7. The process of utilizing waste sulphite liquor for the cultivation of Azotobacter which comprises neutralizing the poisonous constituents of said liquor, sowing said Azotobacter in a medium having a greater nutritive content than said liquor at a temperature suitable for propagation of said Azotobacter, continuously adding said liquor and sugar and phosphates to said medium and aerating to supply nitrogen thereto whereby said bacteria utilize said nitrogen and said nutritive matter to form an albuminoid substance, continuously withdrawing a portion of the material and separating the Azotobacter therefrom and returning a part of the bacteria so withdrawn whereby to build up the concentration thereof in said liquor.

8. The process of utilizing waste liquor containing sugar for the cultivation of Azotobacter which comprises treating said liquor with powdered limestone to substantially neutralize the poisonous constituents thereof, propagating a culture of Azotobacter in a part of the liquor thus treated to obtain an albuminoid material, aerating the liquor containing the culture to remove poisonous substances and to introduce air as a source of nitrogen for the bacteria, withdrawing portions of the material and adding further quantities of the neutralized liquor to the remaining portion, separating the Azotobacter from the portion so withdrawn and returning a part of the separated Azotobacter to the liquor containing the culture, the part not so returned constituting an albuminoid product.

9. The process of utilizing waste liquor containing sugar for the cultivation of Azotobacter which comprises sowing a culture of Azotobacter in a part of said liquor at a temperature suitable for propagation of said Azotobacter, causing the bacteria to propagate and form an albuminoid material in said part of the liquor, aerating the liquor to remove poisonous substances and to introduce air as a source of nitrogen for the bacteria, withdrawing portions of the material and adding further quantities of said waste liquor to the remaining portion, separating the Azotobacter from the portion so withdrawn and returning a part of the separated Azotobacter to the liquor containing the culture, the part not so returned constituting an albuminoid product.

10. The process of utilizing waste sulphite liquor to obtain an albuminoid product which consists in sowing a culture of Azotobacter in a medium having a greater nutritive content than said liquor at a temperature suitable for propagation of said Azotobacter, neutralizing the poisonous constituents of said liquor, continuously adding said liquor and nutritive material substantially devoid of nitrogen to said medium, causing the bacteria to propagate therein and form an albuminoid material, aerating said medium to supply thereto substantially the entire quantity of nitrogen necessary to propagate the Azotobacter, and freezing said product of the sulphite liquor.

GUSTAF OLOF WOLFGANG
HEIJKENSKJÖLD.

CERTIFICATE OF CORRECTION.

Patent No. 1,999,455.  April 30, 1935.

GUSTAF OLOF WOLFGANG HEIJKENSKJÖLD.

It is hereby certified that error appears in the printed specification of the above numbered patent requiring correction as follows: Page 3, second column, line 56, claim 10, for "freezing" read freeing; and that the said Letters Patent should be read with this correction therein that the same may conform to the record of the case in the Patent Office.

Signed and sealed this 9th day of July, A. D. 1935.

(Seal)
Bryan M. Battey
Acting Commissioner of Patents.